Aug. 2, 1932. E. CHANDLER 1,869,355
CART
Filed June 8, 1929
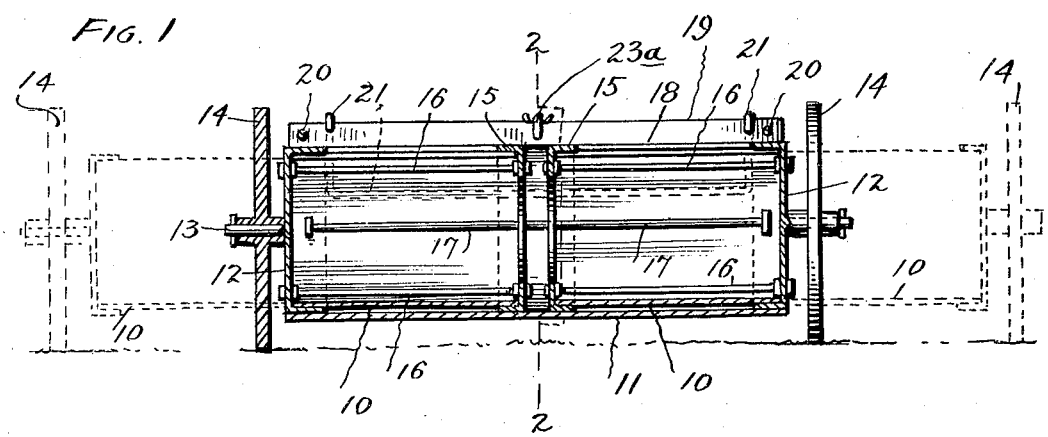
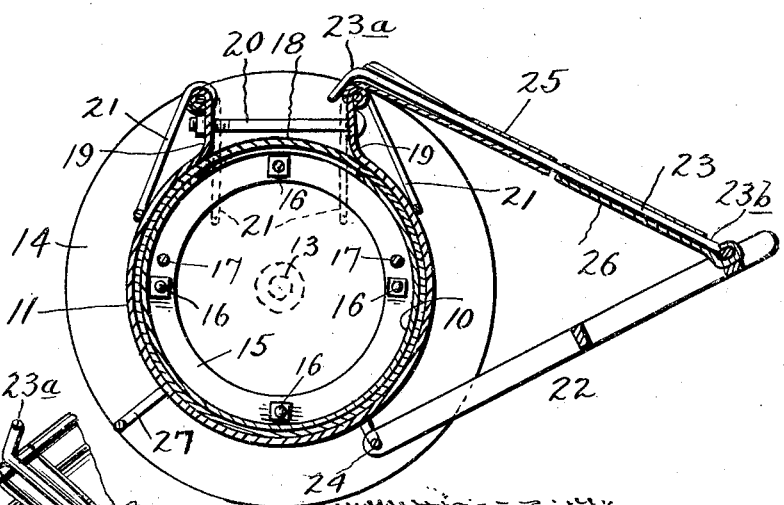
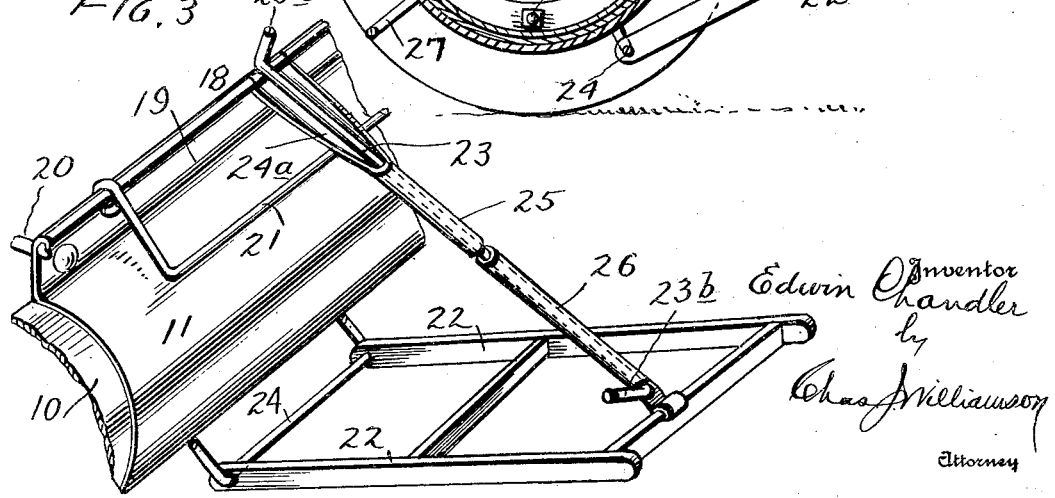
Edwin Chandler Inventor
by Chas. J. Williamson Attorney Patented Aug. 2, 1932

1,869,355

UNITED STATES PATENT OFFICE

EDWIN CHANDLER, OF LISBON, OHIO

CART

Application filed June 8, 1929. Serial No. 369,306.

In making my invention, I have aimed to supply a cart especially suitable for use in cemeteries that will be adaptable particularly in taking care of or handling the earth removed in digging a grave and filling the grave and also available for other uses around or about a cemetery which call for the use of a wheelbarrow or readily moved vehicle. Of course, my invention is applicable to other uses or purposes than cemetery use, but as I have produced my invention with that special use in view, it will be convenient in describing my invention and the advantages thereof to refer to cemetery use. By the use of my invention, the dirt or earth dug in making a grave is not piled on the ground alongside the grave, but is placed in a portable receptacle as digging proceeds which upon the completion of the digging may be moved from the immediate vicinity of the grave, so that the unsightly appearance produced by a mound or heap of freshly dug earth may be avoided and the space around the grave may not be obstructed. Then to fill the grave, it is necessary merely to bring the receptacle back to the edge of the grave and dump its contents into the grave, thus avoiding labor and time required by the ordinary method of shoveling and being otherwise obviously advantageous. A portable receptacle of sufficient capacity to hold the quantity of earth involved in grave digging and having in view the operation of filling the grave by dumping its contents must have a length at least that of the grave, and therefore, it is long or of considerable length, say a length of eight feet. A cart of this length obviously in view of the limitations created by graves and grave stones in a cemetery, presents or creates difficulties of manipulation or maneuvering or moving around. I overcome this difficulty by making the cart telescopic or capable of elongation, to the desired maximum length and contraction to a shorter length, which will present no difficulties whatever in moving it around. When reduced in length it becomes a small cart or vehicle capable of being put to various uses in place of a wheelbarrow.

Having in view the objects of my invention, my invention consists in whatever is comprehended or included within the terms or scope of the appended claims.

In the drawing:—

Fig. 1 is a longitudinal section of a telescopic cart embodying my invention, the full lines showing the cart in its shortest length and the dotted lines showing it extended to its greatest length.

Fig. 2 is a section on the line 2—2 of Fig. 1.

Fig. 3 is a detail view in perspective.

Described in a general way, a cart embodying my invention comprises a body or box of cylindrical or barrel-like form made of several sections that are slidable upon or over one another in a telescopic fashion for the purpose of contracting or elongating the length thereof and having in what in the normal position is the upper part, an opening or hopper for the placing thereinto of dirt or other material and thereafter its removal and at each end of the body is a wheel for supporting and readily transporting the cart.

Describing in detail what is shown in the drawing, the barrel-like or cylinder body consists of three horizontal sections, two similar or duplicate end sections, 10, and a middle section, 11, and the end sections enter the middle section so that in the telescopic action, the end sections move longitudinally within the middle section and longitudinally out of the same.

Each end section at its outer end is closed by a head, 12, which is preferably a casting at the center of which on the outer side is an integral gudgeon or spindle, 13, which projects horizontally and upon which is mounted one of the transporting wheels, 14. At its inner end each end section has a cast ring, 15, with a short radial flange that extends inward, and rods, 16, of suitable number and spaced circumferentially proper distances apart, extend between said flange and said head and through holes therein, to which on the opposite sides of both flange and head nuts are applied to rigidly tie the head and flange together. The section may be a shell of light material such as heavy enough sheet metal situated between head and ring flange.

The ring flanges at the inner ends of the two end sections are connected by several horizontal rods, 17, having nuts screwed on their ends on the outer sides of the flanges to allow the sliding of said flanges over the rods when collapsing or reducing the length of the structure, said nuts constituting stops to arrest the telescopic movement when the structure is elongated to the desired maximum length.

The filling and emptying opening, 18, in the case of the middle section is defined or situated between two upwardly extending flanges 19, which extend longitudinally and said flanges near each end of the middle section are joined or tied together by rods or bolts, 20. Pivotally hung from the upper edge of each of said flanges just inside the flange of each ring, 15, is a U-shaped brace rod, 21, which when the cart is elongated to its maximum length hangs downward within the middle section, and to permit the collapsing or contraction of the cart, each said rod is swung to the outside so that it will not obstruct the inward sliding movement of the end sections. When said brace rods hang down within the middle section, their opposite vertical ends contact with the inner ends of the two outer sections and thus serve as stops or abutments that prevent downward collapse or buckling of the cart when fully extended. In a way, they act as the key of an arch.

Connected with the middle section at the lower part thereof is a handle, 22, shown as extending outward and upward and to the upper side of said handle near its outer end is pivoted a trip rod, 23, which thence extends to and by a hook, 23a on its far end, catches over one of the middle section flanges. Said trip rod is rocked by a handle, 23b near its other end to disengage it from the middle section flange, so as to permit dumping of the cart without changing position of the handle which at its lower end has a pivotal connection, 24, with the middle section and not a rigid connection therewith, so that thus movement of the handle in the turning of the cart for dumping is avoided.

The trip rod, 23, is journalled in two alining tubes, 25 and 26, connected respectively to the middle section flange and to a cross bar of the handle, 22, so that when the hook, 23a is disengaged, as shown in Fig. 3, the cart body may swing forward and downward the tube, 25, sliding along the rod, 23, said tube being cut away or slotted at 24a to clear the hook, 23a.

Upon the lower part of the middle section opposite the place where the handle is connected is a clevis-like arm, 27, for attachment of motor means to move the loaded cart.

What I claim is:—

1. A cart comprising a body of longitudinal telescopic sections, there being two end sections and a middle section and supporting means connected with the end sections which permit rotary movement for dumping, each end section having its outer end closed by a end section having a flanged ring at its inner head and having a flanged ring at its inner end and rods extending between the head and flange of each section and between the flanges of the two sections.

2. A cart comprising a body and ground-engaging and transporting means, the body consisting of a box-like receptacle for material to be transported which is of telescopic sections that extend between said supports and are longitudinally movable one upon the other, said supports at the outer ends of the body being connected with and movable with the movement of the telescopic sections upon one another and the body having a material-receiving and discharging opening normally uppermost and the body being rotatable upon its longitudinal axis to shift such opening to a lower material-discharging position.

3. A cart comprising a hollow cylindrical material-holding body of longitudinal telescopic sections, there being two end sections and a middle section, and having an opening for the admission and discharge of material and supporting wheels connected with the outer ends of the end sections and movable with the sections when slid one upon the other, said body being rotatable for dumping its contents upon a longitudinal axis.

In testimony whereof I hereunto affix my signature.

EDWIN CHANDLER.